US006572720B2

(12) United States Patent
Kerr

(10) Patent No.: US 6,572,720 B2
(45) Date of Patent: Jun. 3, 2003

(54) METHOD FOR LAMINATING HIGH QUALITY TRANSPARENCIES

(75) Inventor: Roger S. Kerr, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 107 days.

(21) Appl. No.: 09/863,855

(22) Filed: May 23, 2001

(65) Prior Publication Data

US 2003/0007021 A1 Jan. 9, 2003

(51) Int. Cl.[7] .............................. C09J 5/00; B32B 31/20

(52) U.S. Cl. ........................ 156/182; 156/235; 156/247; 156/277; 156/289; 156/308.2; 156/323

(58) Field of Search ................................ 156/182, 230, 156/235, 240, 277, 282, 323, 344, 247, 289, 308.2

(56) References Cited

U.S. PATENT DOCUMENTS 5,106,710 A * 4/1992 Wang et al. .................. 430/42
5,203,942 A 4/1993 DeCook et al.
5,268,708 A 12/1993 Harshbarger et al.
5,478,434 A 12/1995 Kerr et al.
5,897,735 A * 4/1999 Peskin ........................ 156/230
6,106,982 A * 8/2000 Mientus et al. ............... 430/14

OTHER PUBLICATIONS

Kerr, "Laminator Assembly Having a Pressure Roller with a Deformable Layer", USSN 09/676,877, (78274P/NAB), filed Sep. 29, 2000.

* cited by examiner

*Primary Examiner*—Curtis Mayes
*Assistant Examiner*—Sing P Chan
(74) *Attorney, Agent, or Firm*—Buskop Law Group

(57) ABSTRACT

Various methods for laminating a high quality transparency which consist of the steps: creating an imaged receiver sheet (140) with a first support layer (150); laminating an imageless second receiver sheet (160) with an second support layer (170) to the imaged receiver sheet (140) thereby encapsulating the image (290); removing the first support layer (150) thereby forming an image sheet (180); laminating the image sheet (180) to a clear plastic base (190), and removing the second support layer (170).

5 Claims, 6 Drawing Sheets

METHOD FOR LAMINATING HIGH QUALITY TRANSPARENCIES

FIELD OF THE INVENTION

The present invention relates to the art of pre-press proofing, and in particular, to a method of preparing high quality transparencies using a method similar to that which is used to create pre-press proofs, such as by the use of pressure and heat to laminate media together.

BACKGROUND OF THE INVENTION

Pre-press proofing is a procedure that is used primarily by the printing industry for creating representative images of printed material. In the printing industry pre-press proofs are used to check for color balance, control parameters and other important image quality requirements, without the cost and time that is required to actually produce printing plates, set up a printing press and produce an example of an representative image, which would result in higher costs and a loss of profits that would ultimately be passed on to the customer.

To create a pre-press proof, first an original image is separated into individual color separations or digital files. The original image is scanned and separated into the three subtractive primaries and black. Typically, a color scanner is used to create the color separations or digital files and in some instances more than four, color separations or digital files are used. Although there are several ways used in the printing industry to create a pre-press proof from the color separations or digital files they are generally one of three types. The first method involves a color overlay system that employs the representative image on a separate base for each color, which is then overlaid to create a pre-press proof. The second method involves a single integral sheet process in which the separate colors for the representative image are transferred one at a time by lamination onto a single base, and a third method involves a digital method in which the representative image is produced directly onto a receiver stock, or onto an intermediate sheet then transferred by lamination onto a receiver stock from digital files.

The representative image to be laminated can be, but is not limited to, being created on a commercially available Kodak image processing apparatus, depicted in commonly assigned U.S. Pat. No. 5,268,708 which describes an image processing apparatus having half-tone color imaging capabilities. The above-mentioned image processing apparatus is arranged to form a representative image onto a sheet of thermal print media. Dye from a sheet of dye donor material is transferred to the thermal print media, by applying a sufficient amount of thermal energy to the dye donor sheet material to form the representative image. The image processing apparatus is comprised generally of a material supply assembly, which includes a lathe bed scanning subsystem. The scanning subsystem includes: a lathe bed scanning frame, translation drive, translation stage member, printhead, imaging drum and media exit transports.

The operation of the image processing apparatus comprises: metering a length of the thermal print media (in roll form) from the material supply assembly. The thermal print media is then measured and cut into sheet form of the required length and transported to the imaging drum, registered, wrapped around and secured onto the imaging drum. Next, a length of dye donor material (in roll form) is also metered out of the material supply assembly, then measured and cut into sheet form of the required length. The material is then transported to the imaging drum, wrapped around the imaging drum utilizing a load roller which is described in detail, in commonly assigned U.S. Pat. No. 5,268,708, such that it is superposed into the desired registration with respect to the thermal print media (which has already been secured to the imaging drum).

After the dye donor sheet material is secured to the periphery of the imaging drum, the scanning subsystem or write engine provides the imaging function. This imaging function is accomplished by retaining the thermal print media and the dye donor sheet material on the imaging drum while it is rotated past the printhead. The translation drive traverses the printhead and translation stage member axially along the axis of the imaging drum, in coordinated motion with the rotating imaging drum. These movements combine to produce the representative image on the thermal print media.

Once a representative image has been formed on the thermal print media, the dye donor sheet material is then removed from the imaging drum. This is accomplished without disturbing the thermal print media that is beneath it. The dye donor sheet material is then transported out of the image processing apparatus by means of the material exit transport. Additional dye donor sheet materials are sequentially superimposed with the thermal print media on the imaging drum, and then imaged onto the thermal print media as previously mentioned, until the representative image is completed onto the thermal print media. The completed representative image formed thereon is then unloaded from the imaging drum and transported by the receiver sheet material exit transport to an exit tray in the exterior of the image processing apparatus.

After a representative image has been formed on the thermal print media as previously described, it is then transferred to the receiver stock such that the pre-press proof is representative of an image that would be printed on a printing press. A Kodak Laminator as described in U.S. Pat. No. 5,478,434 can be used to bond or laminate the representative image as a part of a color proofing system, but bonding is not limited to such a device. U.S. Pat. No. 5,203,942 describes a Kodak Laminator that employs a lamination/de-lamination system as applied to a drum laminator and pending U.S. patent application Ser. No. 09/676,877, now U.S. Pat. No. 6,463,981 describes a Kodak Laminator that employs endless belts incorporated into the lamination apparatus. For the purpose of this patent application the laminator described in pending U.S. patent application Ser. No. 09/676,877, now U.S. Pat. No. 6,463,981, will be used. It should be noted that the present invention described in this disclosure is not limited to a Kodak Laminator or type of laminator referenced above.

Generally laminating a pre-press proof is a two-pass process. For the first step, a sheet of pre-laminate, which has a pre-laminate support layer and an encapsulation or protective layer, is placed on top of a receiver sheet, which is also called “receiver stock” in the industry. This construction of multiple layers is a lamination sandwich, which is fed into the laminator. Once the lamination sandwich exits the laminator the pre-laminate support layer is peeled away from the now pre-laminated receiver stock.

For the second pass, the imaged thermal print media with the representative image formed thereon is placed on the pre-laminated receiver stock with representative image face down on the pre-laminated receiver stock and fed into the laminator. After the lamination sandwich has exited the laminator, the thermal print support layer is peeled away, leaving the completed pre-press proof simulating an image produced on a printing press.

Though the above-described lamination method works well for both laser thermal ink jet pre-press proofs, there exists a need for high quality transparences.

SUMMARY OF THE INVENTION

The present invention provides a method for producing high quality transparences. Specifically, the invention involves laminating a transparency consisting of the steps of: creating an imaged receiver sheet having an image, a first thermal print layer, and a first support layer; consisting of a first support base, first aluminized layer, and a first release layer. Laminating the imaged receiver sheet to an imageless receiver sheet with a second thermal print layer and a second support layer; consisting of a second support base, second aluminized layer, and a second release layer, thereby encapsulating the image; removing the first support layer thereby forming an image sheet; laminating the image sheet to a clear plastic base, and removing the second support layer, forming a transparency.

The invention further involves a method for laminating a transparency consisting of the steps of: laminating a clear plastic base to a clear receiver sheet having a first thermal print layer and a first support layer; consisting of a first support base and first release layer, removing the first support layer forming a prelaminated construction; creating an imaged receiver sheet having an image, a thermal print layer, and the second support layer, consisting of a second support base, aluminized layer and second release layer. Laminating the pre-laminated construction with the imaged receiver sheet, thereby encapsulating the image; and removing the second support layer, forming a transparency.

The invention also relates to a method for laminating a transparency consisting of the steps of: creating an imaged receiver sheet having an image, a thermal print layer, and a support layer; consisting of a support base, aluminized layer and release layer, laminating a clear plastic base to the imaged receiver sheet; and removing the first support layer, forming a transparency.

Finally, the invention also relates to a method for proofing a transparency, consisting of the steps of: creating an imaged receiver sheet with an image, a first thermal print layer, a support layer; consisting of a support base, aluminized layer and first release layer; laminating a clear receiver sheet with a second thermal print layer, a clear support layer consisting of; a clear support base and second release layer with the imaged receiver sheet, thereby encapsulating the image; removing the first support layer forming a transparency; viewing the transparency for image quality; and if the image is acceptable to the user, laminating the transparency to a receiver stock, removing the clear support if desired, forming a pre-press proof.

The invention, and its objects and advantages, will become more apparent, in the detailed description of the preferred embodiments presented below.

DETAILED DESCRIPTION OF THE INVENTION

The present description will be directed, in particular, to elements forming part of, or cooperating more directly, with an apparatus in accordance with the present invention. It is to be understood that elements not specifically shown or described may take various forms well known to those skilled in the art. For the sake of discussion, but not limitation, the preferred embodiment of the present invention will be illustrated in relation to a laminating apparatus for making high quality transparencies.

Figure 1:
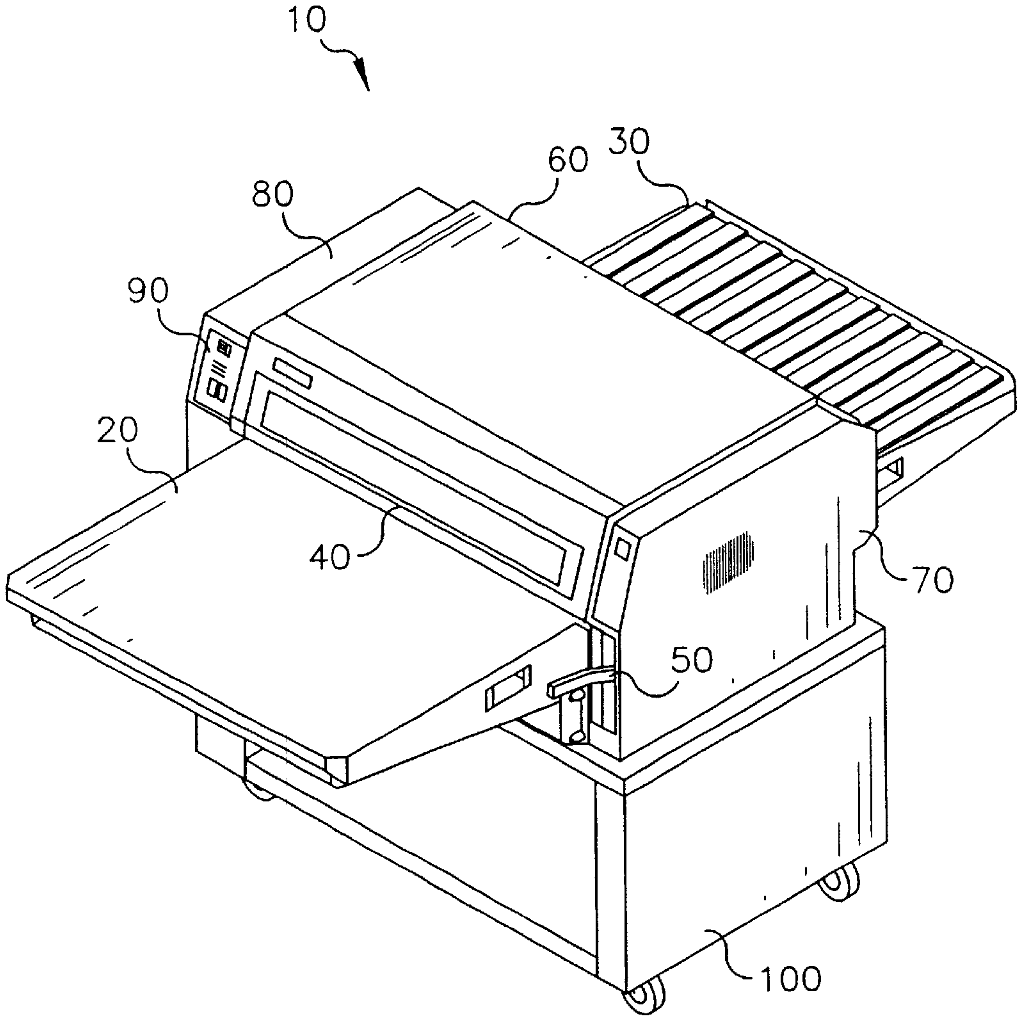
FIG. 1 is a perspective view showing a laminator known in the related art used with the present invention.

Referring to the drawings wherein like reference numerals represent identical or corresponding parts throughout the several views. Referring to FIG. 1, there is shown perspective view of laminator 10 as described in U.S. patent application Ser. No. 09/676,877. The laminator has an entrance table 20, exit table 30, entrance slot 40, pressure lever 50, top cover 60, right side cover 70, left side cover 80, control panel 90 and lamination base 100.

Figure 2:
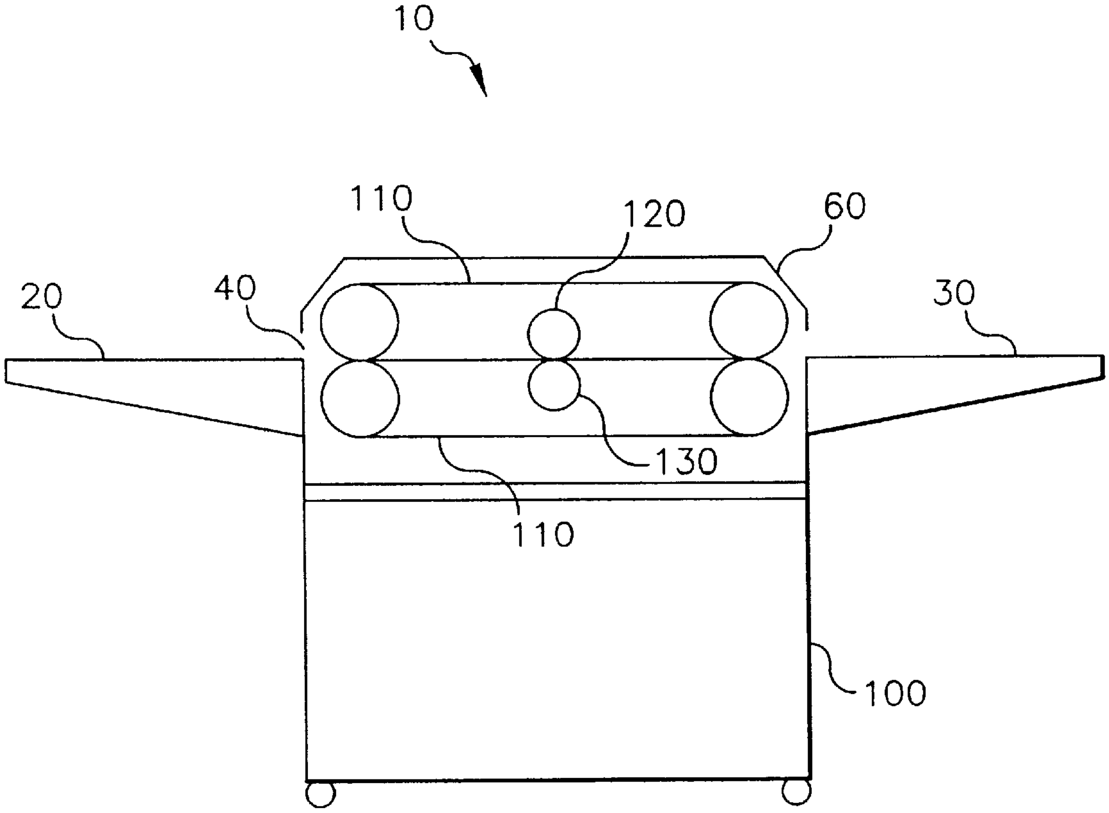
FIG. 2 is a schematic right side elevation of the laminator of FIG. 1.

FIG. 2 is a schematic right side elevation of the laminator of FIG. 1 showing endless belts 110 with upper lamination roller 120 and lower lamination roller 130 which convey the media to be laminated through the laminator 10. Media to be bonded or laminated passes between the endless belts 110. Upper lamination roller 120 and lower lamination roller 130 provide heat and pressure to laminate the desired media together. This configuration with upper lamination roller 120 and lower lamination roller 130 known in the art as a "straight-through" laminator. Although the illustrated embodiments show both the upper lamination roller 120 and lower lamination roller 130 as heated pressure rollers, it also should be recognized that only one of the upper lamination roller 120 and lower lamination roller 130 maybe heated. It is further recognized that both upper lamination roller 120 and lower lamination roller 130 do not have to be heated for cold lamination applications.

The following methods are usable for forming a high quality transparency 200 with a resolution of between about 1400 and about 4000 dpi, although in the most preferred embodiment, the high resolution is between 1800 and 3000 dpi.

Generally laminating a high quality transparency 200 of this type is a two-pass process the present invention contemplates a one pass construction as well. The image can be initially created on thermal print media with an ink jet printer, laser printer, or any other printing method known in the art.

Figure 3:
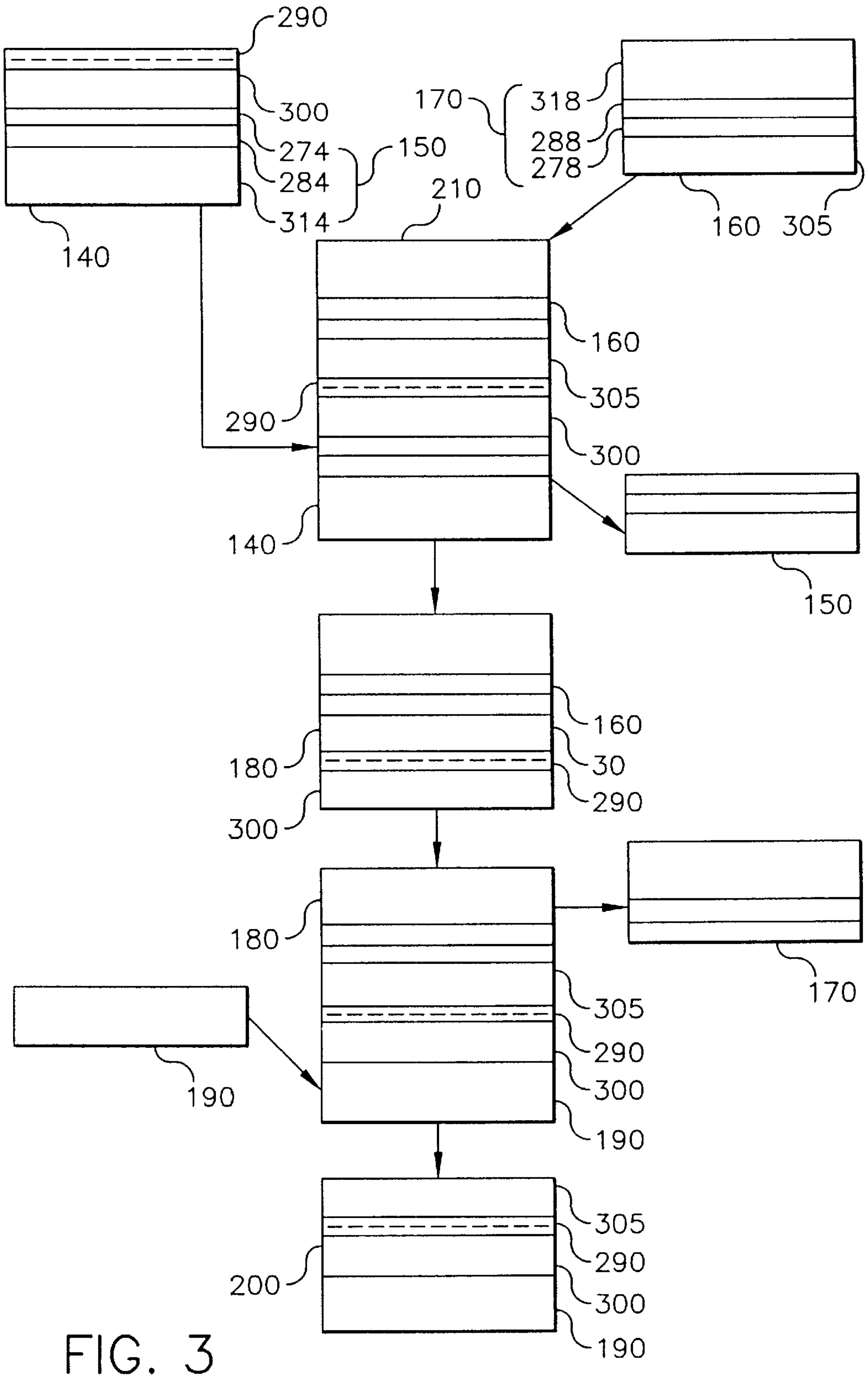
FIG. 3 is a block diagram showing one embodiment of the method for producing a high quality transparency of the invention.

Referring to FIG. 3 a block diagram is shown outlining a method for laminating a high quality transparency 200 consisting of the steps of: creating an imaged receiver sheet 140 having an image 290 a first thermal print layer 300 and a first support layer 150 comprising of a first support base 314, a first aluminized layer 284 and a first release layer 274. It should be noted that the support layer 150; may be comprised of several layers or just a single support base 310. Next, an imageless second receiver sheet 160 having a second thermal print layer 305 and a second support layer 170 is used. The second support layer 170 comprises a second support base 318, a second aluminized layer 288, and a second release layer 278. It should be noted that the second support layer 170 may be comprised of several layers or just a single support base 310. The imageless second receiver sheet 160 is then laminated to the imaged receiver sheet 140 thereby encapsulating the image 290 between the first thermal print layer 300 and second thermal print layer 305. The first support layer 150 is removed from the resultant lamination sandwich 210, forming an image sheet 180. Next, the image sheet 180 is laminated to a clear plastic base 190, and then the second support layer 170 is removed producing a high quality transparency 200

This method is also usable forming a high quality transparency 200 with a resolution of between about 1400 and about 4000 dpi.

Figure 4:
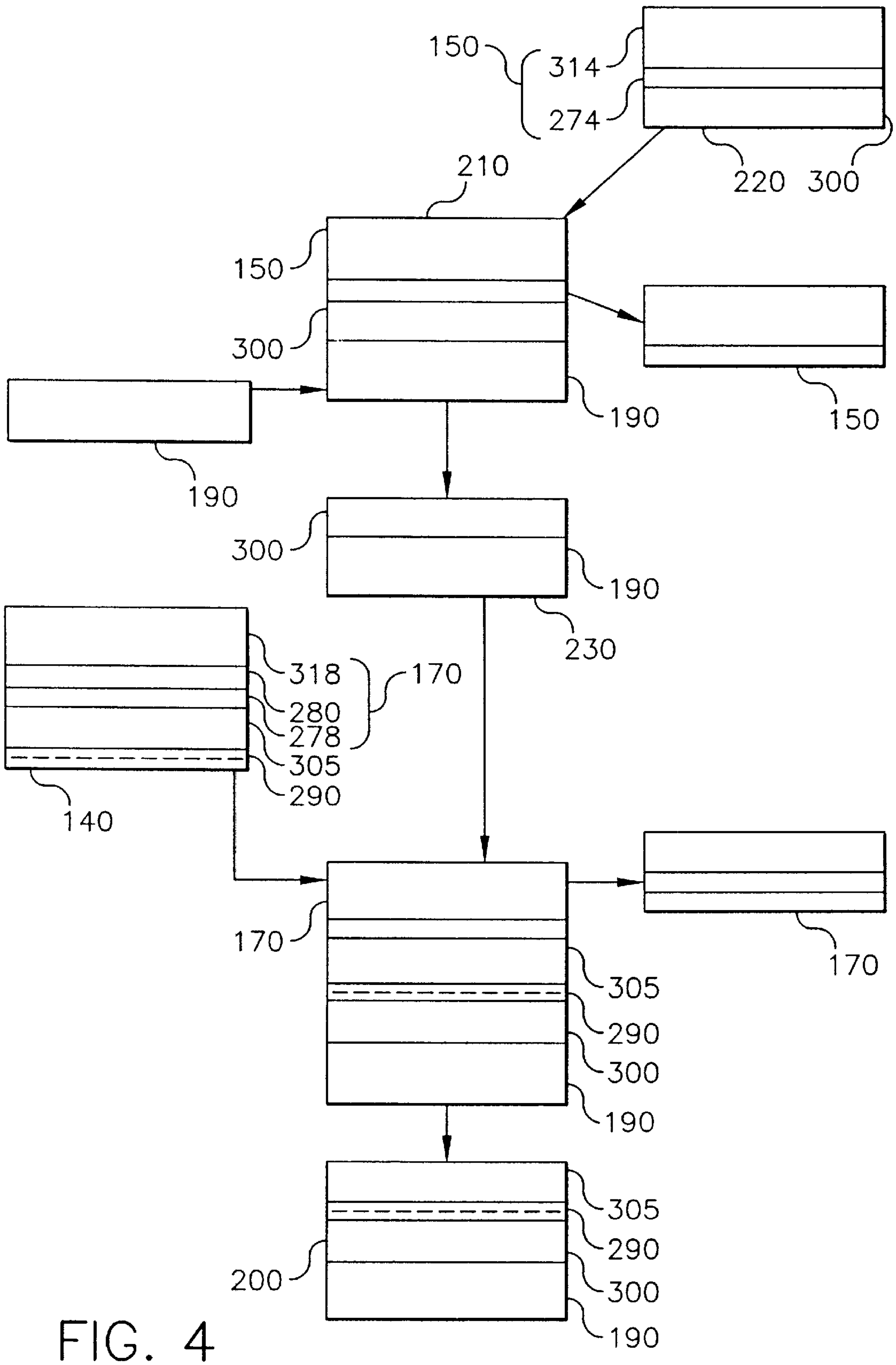
FIG. 4 is a block diagram showing a second embodiment of the method for producing a high quality transparency.

Referring to FIG. 4 a block diagram is shown outlining another embodiment of the invention. A method for laminating a high quality transparency 200 consists of the steps of: laminating a clear plastic base 190 to a clear receiver sheet 220 having a first thermal print layer 300 and a first support layer 150 comprising of a first support base 314 and first release layer 274. It should be noted that the first support layer 150 may be comprised of several layers or a single support base 310. The first support layer 150 is removed forming a pre-laminated construction 230. An imaged receiver sheet 140 is formed having an image 290, a second thermal print layer 305, with a second support layer 170, comprised of a second support base 318, aluminized layer 280, and second release layer 278. It should be noted that the second support layer 170, may be comprised of several layers or a single support base 310. The pre-laminated construction 230 is then laminated with the imaged receiver sheet 140, thereby encapsulating between the first thermal print layer 300 and second thermal print layer 305. Next, the second support layer 170 is removed producing a high quality transparency 200.

This embodiment is also usable for forming a high quality transparency 200 with a resolution of between about 1400 the image 290 is and about 4000 dpi.

Figure 5:
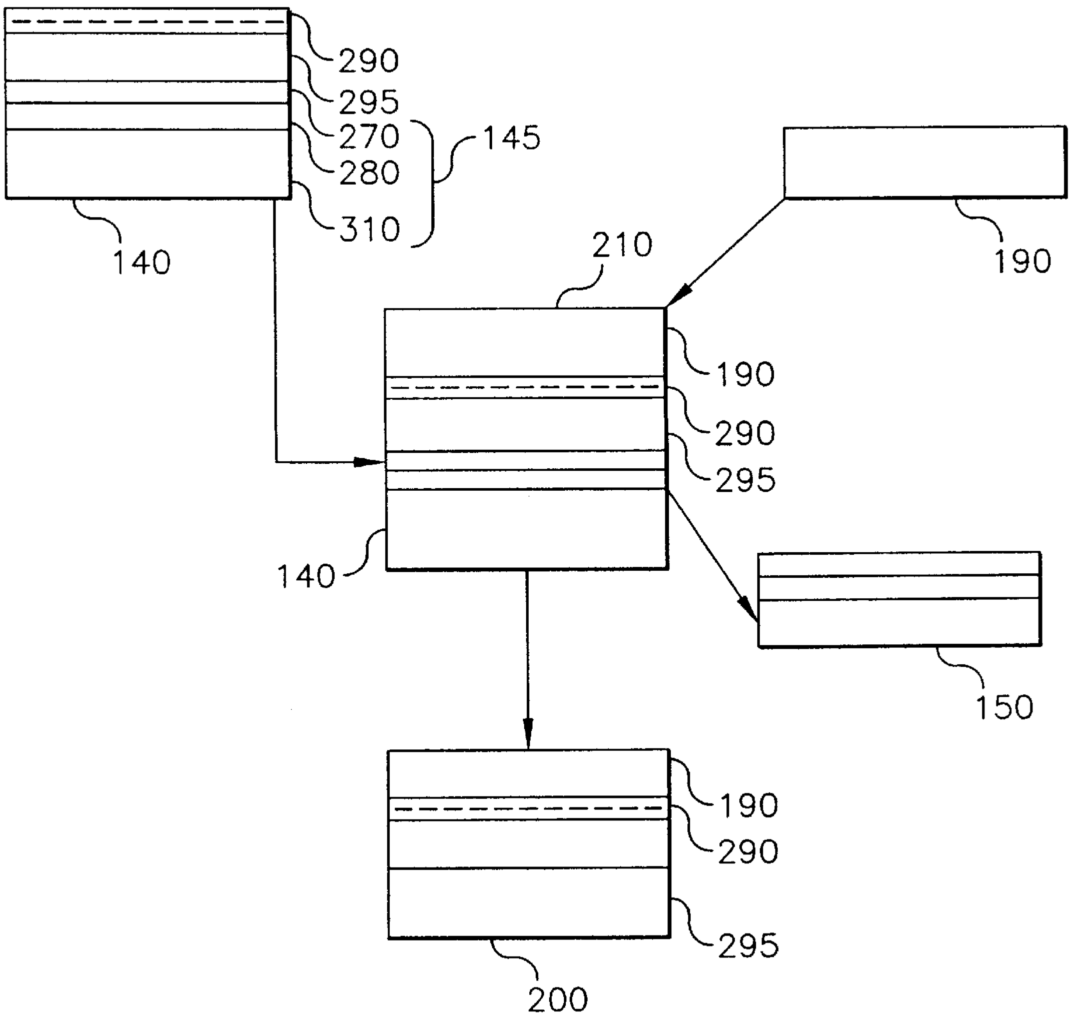
FIG. 5 is a block diagram showing a third embodiment of the method for producing a high quality transparency.

Referring to FIG. 5 a block diagram is shown outlining another embodiment of the invention. In this embodiment, the method for laminating a high quality transparency 200 consists of the steps of: creating an imaged receiver sheet 140 having an image 290, a thermal print layer 295, and a support layer 145, which comprises support base 310, aluminized layer 280 and release layer 270. It should be noted that support layer 145; may be comprised of several layers or a single support base 310. Next, the clear plastic base 190 is laminated to the imaged receiver sheet 140 thereby encapsulating the image between the thermal print layer 295 and the clear plastic base 190. The support layer 145 is then removed, forming a high quality transparency 200. The clear plastic base 190 can be made from polyester, polypropylene, polyethylene and or mixtures thereof, or other plastic materials well known in the art.

This embodiment is also usable for forming a high quality transparency 200 with a resolution of between about 1400 and about 4000 dpi.

Figure 6:
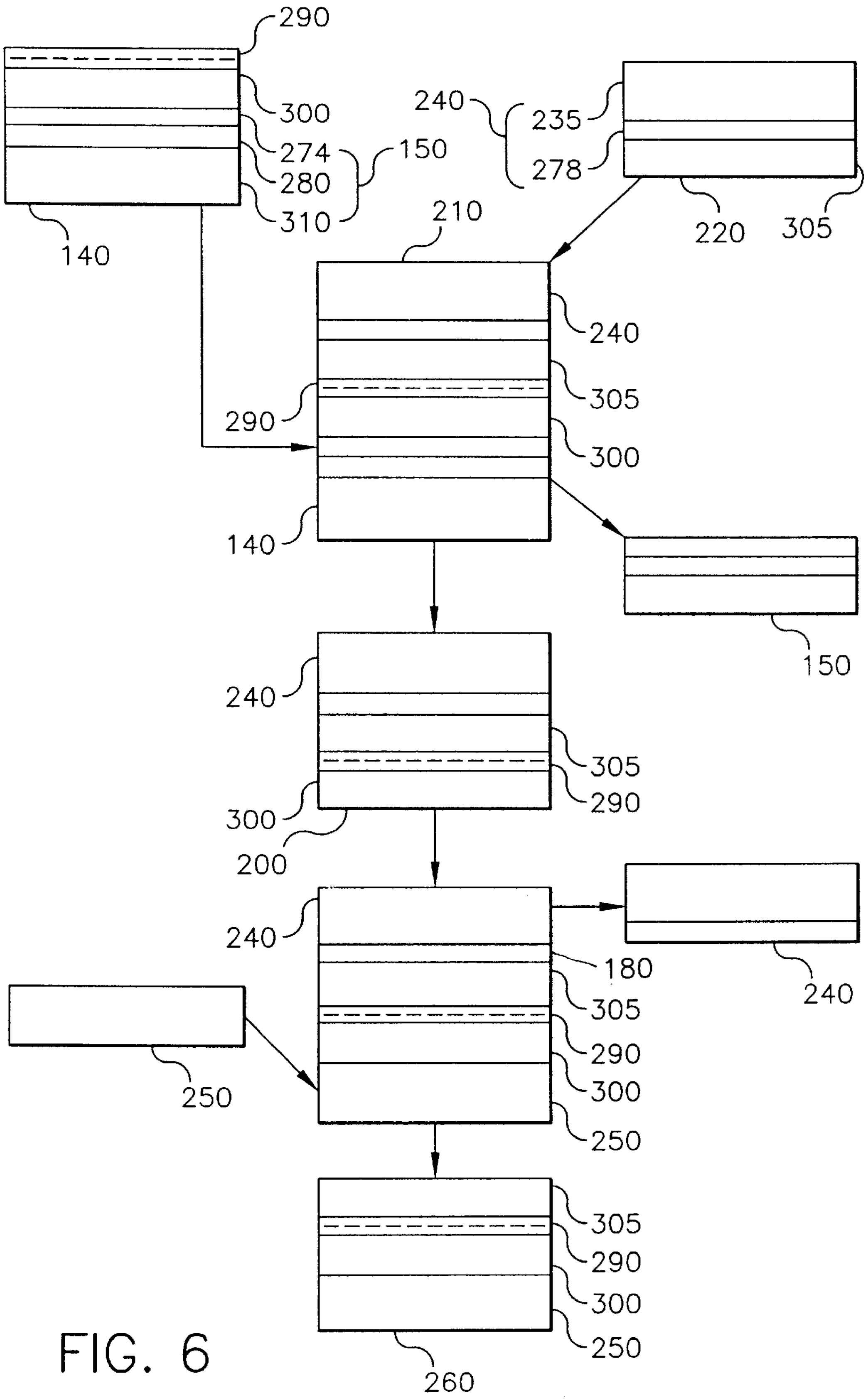
FIG. 6 is a block diagram showing a fourth embodiment of method for producing a high quality transparency.

Referring to FIG. 6 a block diagram is shown outlining another embodiment of the invention. In this embodiment, the method for laminating a high quality transparency 200 consists of the steps of: creating an imaged receiver sheet 140 having an image 290, first thermal print layer 300 and a first support layer 150, which comprises a support base 310, a aluminized layer 280 and first release layer 274. It should be noted that the first support layer 150 may be comprised of several layers or a single support base 310. Next, a clear receiver sheet 220 having a second thermal plastic layer 305 and clear support layer 240 consisting of a clear support base 235 and second release layer 278 is then laminated with to the imaged receiver sheet 140 thereby encapsulating the image 290 between the first thermal plastic layer 300 and the second thermal plastic layer 305. The first support layer 150 is removed forming a high quality transparency 200. The high quality transparency 200 could then be viewed for image quality, color and content; if the image is acceptable to the user, the high quality transparency 200 can be laminated to a receiver stock 250 forming a pre-press proof 260. The clear support layer 240 could be removed.

This embodiment is also usable for forming a high quality transparency 200 with a resolution of between about 1400 and about 4000 dpi.

The invention has been described in detail with particular reference to certain preferred embodiments thereof, but it will be understood that variations and modifications can be effected within the scope of the invention.

PARTS LIST

| PARTS LIST | |
|---|---|
| 10. | Laminator |
| 20. | Entrance table |
| 30. | Exit table |
| 40. | Entrance slot |
| 50. | Pressure lever |
| 60. | Top cover |
| 70. | Right side cover |
| 80. | Left side cover |
| 90. | Control panel |
| 100. | Lamination base |
| 110. | Endless belts |
| 120. | Upper lamination roller |
| 130. | Lower lamination roller |
| 140. | Imaged receiver sheet |
| 145. | Support layer |
| 150. | First support layer |
| 160. | Imageless second receiver sheet |
| 170. | Second support layer |
| 180. | Image sheet |
| 190. | Clear plastic base |
| 200. | High quality transparency |
| 210. | Lamination sandwich |
| 220. | Clear receiver sheet |
| 230. | Pre-laminated construction |
| 235. | Clear support base |
| 240. | Clear support layer |
| 250. | Receiver stock |
| 260. | Pre-press poof |
| 270. | Release layer |
| 274. | First release layer |
| 278. | Second release layer |
| 280. | Aluminized layer |
| 284. | First aluminized layer |
| 288. | Second aluminized layer |
| 290. | Image |
| 295. | Thermal plastic layer |
| 300. | First thermal print layer |
| 305. | Second thermal print layer |
| 310. | Support base |
| 314. | First support base |
| 318. | Second support base |

What is claimed is:

1. A method for laminating transparency consisting of the steps of:

a) creating an imaged receiver sheet having an image, a first thermal print layer, and a first support layer;

b) forming an imageless receiver sheet with a second thermal print layer and a second support layer;

c) laminating the imageless receiver sheet with the imaged receiver sheet, thereby encapsulating said image;

d) removing said first support layer thereby forming an image sheet;

e) laminating the image sheet using a step consisting of heating and applying pressure to encapsulate the image between the first thermal print layer and the second thermal print layer, to a clear plastic base; and f) removing the second support layer to create a high quality transparency with a dpi between 1400 dpi and 4000 dpi.

2. The method of claim 1, wherein said first support layer comprises a support base and release layer.

3. The method of claim 1, wherein said first support layer comprises a support base, an aluminized layer, and a release layer.

4. The method of claim 1, wherein said second support layer comprises a support base and a release layer.

5. The method of claim 1, wherein said second support layer comprises a support base, an aluminized layer, and a release layer.

* * * * *